Feb. 6, 1934.   S. T. WILES   1,946,252
METHOD OF AND APPARATUS FOR PROPAGATING REACTIONS
Filed Nov. 30, 1931
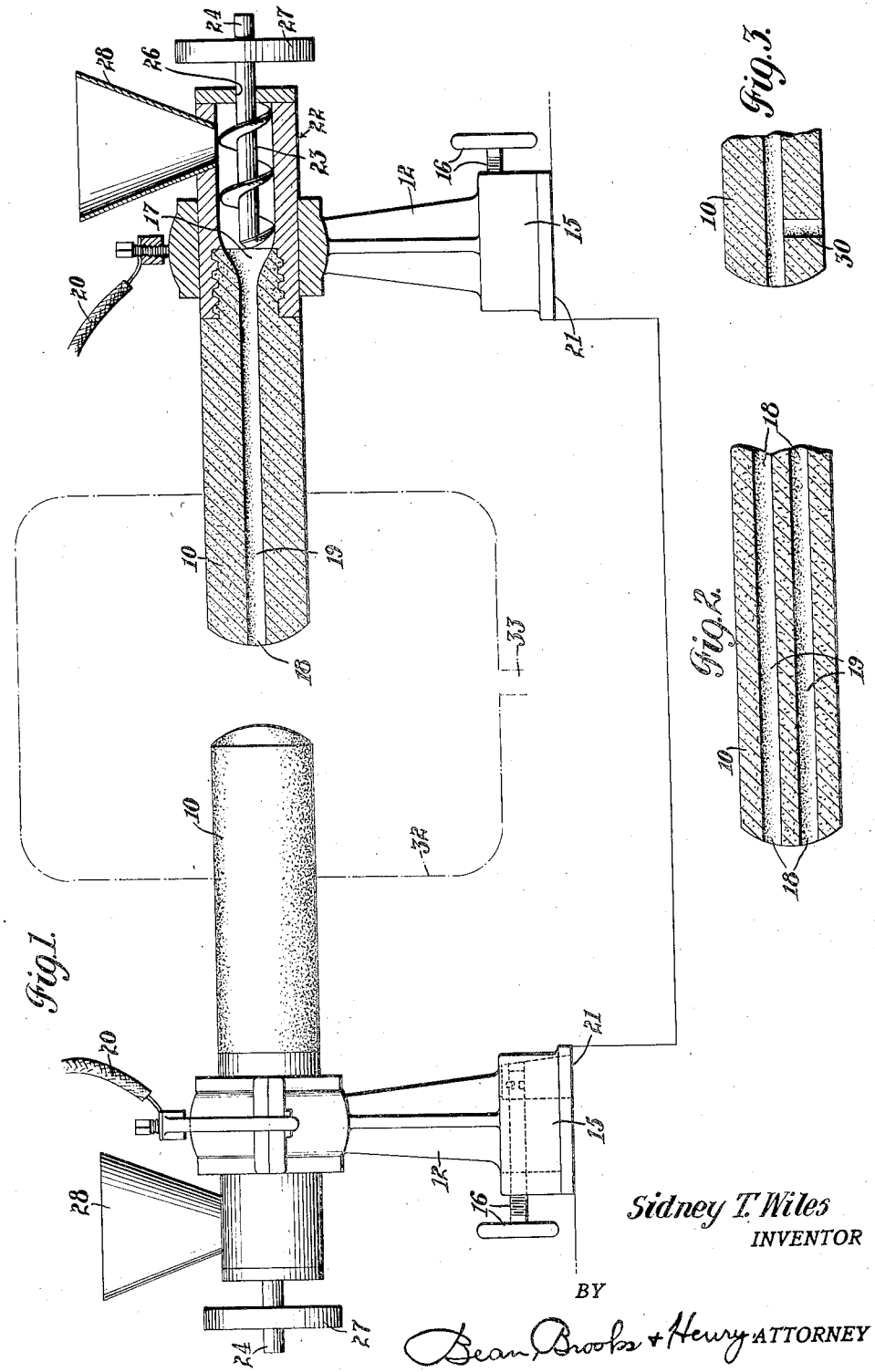
Sidney T. Wiles
INVENTOR
BY
Bean, Brooks & Henry ATTORNEY Patented Feb. 6, 1934

1,946,252

UNITED STATES PATENT OFFICE 1,946,252

METHOD OF AND APPARATUS FOR PROPAGATING REACTIONS

Sydney T. Wiles, Buffalo, N. Y., assignor to Buffalo Electric Furnace Corporation, Buffalo, N. Y.

Application November 30, 1931
Serial No. 578,077

7 Claims. (Cl. 13—34)

This invention relates to a method of and apparatus for propagating chemical reactions, and it has particular reference to an apparatus serving concurrently as electrode, as a furnace, as a reaction chamber, as a means in which reactive material is carried to the region of reaction, and permitting the removal of the finished product.

This application is a continuation in part of my copending application Serial No. 324,505, filed December 7, 1928, for Electrothermic reduction of iron ores.

The branch of technology which deals with the propagation of reactions with the aid of heat obtained by the transformation of electrical energy is known as electrothermics. Electrothermal reactions usually involve the utilization of heat in the reaction, rather than the employment of a specific electrical effect, as is the case with electrolytic reactions. The primary electrical effect may, however, be utilized in certain types of electrothermic processes. Heretofore, it has been customary to propagate electrothermic reactions by three means of energy transformation, which appear to exhaust the possibilities. Certain reactions are effected in resistance heaters, wherein the heating effect is obtained by virtue of the resistance of a conductor to the flow of electric current. Two classifications of reaction occur in a resistance furnace. The first deals with reactions contained in a resistor in which such resistor serves only as a mechanical means of transforming electrical energy into heat. In the second type of reaction, the reacting mass itself first acts as the means of transforming electrical energy into heat by acting as the resistor and after reaction takes place, it is no longer a resistor.

Other reactions are propagated in induction furnaces, in which the material being treated is made the secondary of an alternating current transformer. The third means for transforming electric energy into heat energy involves the use of an electric arc. It is in connection with this last named aspect that the present invention has been found to be peculiarly adapted for operation.

Advantages of employing the electric arc as a medium of heat include cleanliness of product due to the avoidance of impurities being picked up; control and cleanliness of atmosphere within the furnace; more accurate control of temperature; more perfect control of slag; and other advantages that can be regarded as coincident with the source of heat free of contaminating impurities, carbon pickup, etc.

In connection with these considerations, it may now be said that the invention contemplates the use of a reaction zone inside an electrode, the solid body portions of which are capable of conducting sufficient electrical current to produce the desired arc. This zone can be defined by a portion of one or more longitudinal chambers running through the electrode. The gap and power input of the electrodes can be adjusted under controlled conditions to provide the proper arc when electrically energized. Reactive material is fed under controlled conditions through the electrode at rates independent of the movement of the electrode, and the feeding of the electrode and the feeding of reactive material can be substantially independent of each other with reference to the proportions and form of the reactive material to provide the desired reaction inside the electrode.

From another aspect, the invention embraces the treatment of materials which are not available as raw materials in ordinary methods. A common problem in metallurgical, as well as electro-thermal industries, is the utilization of fine material containing desirable values, but previously unworkable because of their state of division. It is well known that finely divided mineral or other material, such as flue dust, precipitates from solutions, crushed concentrates, residual acids from roasted pyrites, etc., contain high percentages of valuable metal, but it is difficult to recover these metals by the usual methods of smelting because of their physical condition. In this regard it is difficult to maintain the finely divided reactive charge in a turbulent atmosphere for sufficient time to allow the reaction to be complete. Such substances, when heated to the temperature of reaction, generate gases which tend to carry away from the furnace a substantial amount of the unreacted substances.

According to this invention means are provided for treating these fine materials with heat under conditions which confine them within a high temperature chamber or zone from which they can escape only by progressing toward and through the arc. When the rate of feeding is properly controlled, it is possible to realize the proper reactions before the material has reached and passed through the arc and cannot therefore pass out of the furnace in an unreacted condition.

In the furnace covered by this invention the finely divided physical condition not only creates conditions wherein there are no difficulties as to the treatment, but improves the conditions for an efficient reaction because of the increased area of contact of the reacting materials, and because the small mass permits a very rapid heating of the materials to the reaction temperature.

In still another aspect, the invention may be regarded as contemplating an improved means for controlling reactions between solid reaction materials or between solid materials and gaseous substances. It has heretofore been proposed to feed a charge into a furnace, heated either electrically or by means of combustible gases, through a vertically disposed chute through which the charge could flow by means of gravity. Such manipulation is encountered in the ordinary operation of a blast furnace, wherein a charge of ore, fluxing material, and carbon, are fed by means of a hopper into the top of the furnace.

In the present invention gravity feeding devices or chutes of this kind are avoided, because they do not permit of the treatment in the desired manner, of many substances which are indicated in connection with the other aspects of the invention, hereinabove discussed, nor do they permit of suitable control. Reactions between particles of solid material are slow. This is true because two substances will react only when they come in contact with each other. The reactions require time, and the time depends upon the surface contact. Small particles react more rapidly than larger lumps. In other words the rate or speed of reaction is a function of exposed surface, which is in turn a function of the state of division of the material. According to this invention, it is not necessary to consider only crude natural ore to be treated. Other materials may be treated, such as roll scale, pyrites sinter, and many other materials containing carbons or to which carbon may be added. It has been found advantageous to employ reactive materials which have been finely divided. Semi-finished or finished products may be treated together with a reagent, for the purpose of replacing undesirable elements with desirable elements. The desirable elements with which the undesirable elements are replaced may be the major portion of the original.

The several foregoing matters, and others which need not be here specifically discussed, can be better understood from a consideration of certain specific and illustrative applications of the invention. To this end a simple construction serving to provide a proper reaction zone for purposes of the invention is illustrated in the accompanying drawing, forming a part of this specification, of which Fig. 1 is a cross-section including an arrangement of electrodes constructed and positioned according to one form of the invention;

Fig. 2 is a fragmentary longitudinal section of an alternative form of electrode included in the invention; and Fig. 3 is a fragmentary longitudinal section of an electrode having an angular discharge opening adjacent its arc end.

Electrodes 10 are arranged substantially horizontally to serve as furnaces and are adjustable toward and away from each other by means of slidable pillow blocks 12 which carry the electrodes, and are mounted in suitable supports 15. The pillow blocks are movable at will by means of adjusting devices 16. Thus one of the electrodes can be adjusted toward or away from the other or both may be adjusted simultaneously. The electrodes are composed of carbonaceous material, and one or both of them is provided with an entrance opening 17 and an exit opening 18. These openings communicate longitudinally through the electrode and form a reaction chamber 19. In the form of electrode shown by Fig. 2 a plurality of entrance and exit openings 17 and 18 are formed to provide a plurality of longitudinal reaction chambers in one electrode.

An electric current conductor 20 is connected to the outer end of each electrode and is designed to transmit electrical energy to the electrode from a suitable source of supply (not shown). Thus, the entire length of the electrode serves as a conductor of electricity, that is, a resistance element, and when electrically energized an electric arc is formed between the adjacent ends of the electrodes. It is, of course, understood that one of the electrodes may be in the form of a suitable resistance element that is not provided with a reaction chamber and does not function as a furnace. Conventional insulation, disposed for example a 21, insures proper direction of the electric current through the electrodes.

One or all of the electrodes is provided with a feeding device 22 adjacent its entrance end in which a screw conveyor 23 is mounted. This conveyor includes a shaft 24 mounted in suitably supported bearings 26, and a driven pulley 27 mounted on the shaft is connected to a conventional source of power (not shown) for operating the feeding device. Thus, the reactive material, supplied to a hopper 28 communicating with the feeding device 22, can be fed at any desired rate through the electrode. This feeding device is only a form of construction suitable for moving certain types of material, and it is to be understood that the type of feeding device will vary according to the type of reactive material desired to be fed through the electrode. It is to be understood that suitable electrical devices will be employed for regulating the current supplied to the electrodes in accordance with the characteristics of the arc required under various conditions. When an arc is created between the electrodes, the ends of the latter will be eroded and accordingly the electrodes will be fed toward each other at a predetermined or controlled rate. The feeding of the reactive materials through the electrode is independent of the feeding of the electrode, but these phases of feeding are so regulated that the reaction takes place inside the chamber where it is confined between the unreacted material being fed into the electrode, the walls of the electrode surrounding the reaction chamber, and the arc at the exit end of the electrode. Satisfactory results have been obtained by employing reactive materials which have been finely divided and mixed before feeding them to the furnace, thus insuring increased surface contact. In this manner the resulting products of reaction are superior because of the uniformity of the reaction, the smoothness of the reaction, and because of the advantages of controlling the temperature and atmospheric conditions, before, during, and after the reaction. Confining the charge of reactive material being fed through the electrode prevents dusting during the process of reaction.

After the reaction has proceeded, the reacted material is discharged from the electrode into the zone of the arc, where it may be subjected to certain refining if desired. On the other hand, in instances where it is desirable, an additional exit or discharge opening 30 can be formed in the electrode, and after the reaction has taken place, the material can be discharged before it reaches the arc end of the electrode.

In controlling the atmospheric and pressure conditions surrounding the electrodes, the latter can be enclosed, as indicated at 32, and after discharge from the electrodes the material can be removed through a suitable opening 33.

It should be understood that the electrode itself constitutes the furnace or reaction chamber, and that in this kind of arrangement and construction, together with the controlling features a most desirable heat efficiency for various reactions can be attained. Heat is transmitted to the electrode from the arc into the reaction chamber, the reaction itself involves additional phases of heat, and the heat radiation of the arc outside the electrode provides for further treatment of the material after reaction. All of these phases of heat application are controlled and coordinated with the feeding of the electrode horizontally, and with the independent feeding of the reactive material through the electrode. As the electrode is fed forwardly toward the arc, the portion of the reaction chamber in which the reaction takes place finally becomes the arc end, and the portion of the electrode first containing the unreacted material moves up to become the portion in which the reaction takes place. Thus, every portion of the solid body of the electrode serves as electrical conductor and reaction chamber walls. The substantially horizontal position of the electrode is advantageous, because if thus arranged it lends itself to more accurate control than in a position where the force of gravity may adversely influence the feeding, and by horizontally positioning the electrode its operation is greatly facilitated. The heat throughout the reaction chamber is a gradient heat from the point of the arc back and toward the entrance opening for the raw material, and this heat is controlled according to the nature of the material fed into the electrode, the effect desired to result from the heat, the rate of feeding, etc.

As examples of products of reaction from the electrodes constructed and operated as herein described, it may be mentioned that low carbon steel has been produced from each of the following materials: viz, blast furnace flue dust, hematite ore dust, mill scale, and magnetic sands. Steels of various higher carbon contents have also been made, and the physical properties have been noticeably better than steels of similar analyses made by conventional methods. These steels have been made by charging the raw materials by two methods, one of which involved the forcing of the materials through the energized electrode, together with a small amount of waste gas (carbon monoxide) which was used to agitate the materials. The second consisted in preparing the charge in the form of cylindrical cores of sufficient strength, before reaching the zone of reaction, to transmit pressure from a feeding device, and thereby force the reacting materials and the products of reaction toward the arc end of the electrode.

I have also made ferro-silicon, ferro-manganese, ferro-chromium, and chromium steel in this furnace. In each of these cases the metal oxide was mixed with a reducing agent such as carbon, manganese or silicon and it has been found that the high temperature developed in the reaction chamber resulted in more complete reactions than those obtained in conventional electric furnaces. The equilibrium of reacting materials and the products of reaction changes with the temperature phase created and the higher temperature phase created by this furnace results in an equilibrium of reactions just described that is commercially and metallurgically more desirable than that produced at a lower temperature.

The invention is also applicable for the preparation of chemical compounds, other than ferrous and non-ferrous metallurgical reactions such as calcium carbide, tungsten, carbides, etc.

Likewise the invention further is applicable in the recovery of very finely divided metals which may exist as by-products of other industrial processes, such as the residues of nickel and other catalysts to be found in powdered form in the hydrogenation of unsaturated oils. This involves essentially a melting process, and the present disclosure becomes immediately advantageous over those heretofore known because there is no opportunity for dispersion and/or oxidation of this finely divided material from the reaction chamber.

Despite the tendency of silicon to react with graphite at high temperatures, I find that I may make ferro-silicon without difficulty according to this invention. The charge may consist of clean sand, iron bearing material, carbon, and flux. The product possesses the same physical and chemical advantages as have been enumerated above. I have not experienced difficulty due to the corrosion of the electrode, but, on the contrary, have observed that the inner surface is quite smooth at the conclusion of the operation.

The various complex alloys may all be made in the same manner, and hence additional examples would be superfluous.

From the foregoing examples, it may be understood that the invention is applicable to various other specific uses, including the reduction of complex nickeliferous and other refractory ores, manufacture of metals, or refinement of metals, the fixation of atmospheric nitrogen via the cyanamid method, the preparation of various alloys, carbides, and silicides, the recovery of metallurgical values from fine materials, and various other conditions pertaining to the electrothermic and metallurgical fields. Such details of application, however, will now be apparent to those skilled in the art, and hence I desire these specifications to be regarded as illustrative of the principles of the invention, as defined by the scope of the appended claims.

What I claim is:

1. An apparatus for treating reactive materials comprising a substantially horizontal elongate member of homogeneous material capable of efficiently conducting heat and electricity, said member having entrance and exit openings communicating to provide for the passing of charges of reactive materials longitudinally through the elongate member, means for feeding charges of reactive materials through said member, means for transmitting electric current to one end of the elongate member, means for engendering an electric arc at the other end of the elongate member to provide heat therein, and means for moving the elongate member, movement of the elongate member and the feeding of the material therethrough being coordinated with the intensity of the electric heat applied to produce optimum reduction of material in the elongate member.

2. A furnace comprising opposed electrodes arranged substantially horizontally, one of the electrodes having openings for feeding reactive material therethrough, means for energizing the electrodes to provide an electric arc between them, and means for progressively feeding reactive materials through the electrode toward the arc, said electrode having a reaction zone inside the electrode confined between the unreacted material and the arc, whereby the materials fed toward the arc end of the electrode are subjected to chemical reaction inside the electrode.

3. A furnace comprising walls constructed of a corbonaceous electrically conducting material, said furnace having entrance and exit openings communicating substantially horizontally therethrough, means for transmitting electrical current to the entrance portions of the furnace, and means for engendering an electric arc at the exit portion of the furnace, said communicating openings providing means for receiving reactive material fed through the furnace, said walls serving to conduct the electrical current from one extremity of the furnace to the other to transmit heat generated by said arc to the material passing through the furnace to achieve the desired reaction therein.

4. As an electric furnace, an elongated electrode having an entrance opening and an exit opening communicating substantially horizontally therethrough to provide a longitudinal heating chamber inside the electrode, the entire walls of the electrode constituting electric current and heat conducting medium, and means for energizing the electrode to provide an arc at the exit end thereof.

5. A furnace comprising opposed electrodes arranged substantially horizontally, one of the electrodes having openings for feeding reactive material therethrough, means for energizing the electrodes to provide an electric arc between them, and means for progressively feeding reactive materials through the electrode toward the arc, said electrode having a reaction zone inside the electrode confined between the unreacted material and the arc, said electrode having a transverse opening adjacent the arc end thereof whereby materials fed toward the arc end of the electrode are subjected to chemical reaction inside the electrode and products of reaction are discharged through the transverse opening in the electrode adjacent the arc.

6. A method of electrothermally treating reactive materials which comprises feeding charges of reactive materials through a carbonaceous electrode having entrance and exit openings communicating therethrough from one extremity to the other, electrically energizing said electrode to provide a controlled heating arc at one end thereof, and synchronizing the rate of feeding and intensity of the electric arc to insure reaction of the materials inside the electrode and discharging the reacted material before it reaches the arc extremity of the electrode.

7. A method of electrothermally treating materials, which comprises forming an entrance end opening and an arc end opening through an elongated electrode, energizing the electrode to provide an electric arc at the exit end thereof, whereby gradient heat is applied from the the exit end toward the entrance end of the electrode throughout its wall portions, feeding materials progressively into the entrance opening through the electrode toward the arc end opening, and discharging products of reaction through a transverse opening in the electrode before such products reach the end of the electrode whereby the materials are treated by the gradient heat inside the electrode and the treated materials are discharged from the electrode.

SYDNEY T. WILES.